United States Patent
Ishii et al.

(10) Patent No.: US 6,272,082 B1
(45) Date of Patent: Aug. 7, 2001

(54) AUDIO INFORMATION RECORDING MEDIUM AND AUDIO INFORMATION REPRODUCING APPARATUS

(75) Inventors: Hidehiro Ishii, Tokorozawa; Takao Sawabe, Tokyo-to; Shozo Ema, Tokorozawa; Kaoru Yamamoto, Tsurugashima; Yoshinori Hasegawa, Tokorozawa; Tokihiro Takahashi, Kawagoe, all of (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/200,428

(22) Filed: Nov. 27, 1998

(30) Foreign Application Priority Data

Nov. 28, 1997 (JP) .................................................. 9-328009

(51) Int. Cl.$^7$ ........................................................ G11B 7/00
(52) U.S. Cl. .................................. 369/47.15; 369/53.41; 369/47.1
(58) Field of Search .................................. 369/47, 48, 49, 369/50, 54, 58, 59, 32, 275.3, 47.1, 47.15, 47.16, 53.1, 53.11, 53.31, 53.41; 360/48, 51, 53

(56) References Cited

U.S. PATENT DOCUMENTS 5,652,824 * 7/1997 Hirayama et al. ..................... 386/95
5,805,537 * 9/1998 Yamamoto et al. ............... 369/49 X

* cited by examiner

*Primary Examiner*—Muhammad Edun
(74) *Attorney, Agent, or Firm*—Morgan, Lewis & Bockius LLP (57) ABSTRACT

An information recording medium has: a plurality of audio information which are independent of each other; and a plurality of reproducing control information to be used for reproducing the audio information. Each of the plurality of reproducing control information is assign to any of the plurality of audio information. The reproducing control information includes double reproducing control information. The double reproducing control information is assigned to one of the plurality of audio information to which different one of the plurality of reproducing control information has been assigned.

14 Claims, 7 Drawing Sheets

| TITLE GROUP NUMBER | TRACK NUMBER | START ADDRESS | END ADDRESS | ATTRIBUTES | DOUBLE FLAG | AMOUNT OF TIME |
|---|---|---|---|---|---|---|
| | | | | | | TOTAL REPRODUCTION TIME OF DISK |
| | | | | | | TOTAL RECORDING TIME OF DISK |
| 1 | | | | | | TOTAL REPRODUCTION TIME OF GROUP 1 |
| 1 | 1 | 50000 | 60000 | 48k, 16bit, 2ch, E-on | 0 | REPRODUCTION TIME OF TRACK |
| 1 | 2 | 60001 | 70000 | 48k, 16bit, 2ch, E-on | 0 | REPRODUCTION TIME OF TRACK |
| 1 | 3 | 70001 | 80000 | 48k, 16bit, 2ch, E-on | 0 | REPRODUCTION TIME OF TRACK |
| 1 | 4 | 80001 | 90000 | 48k, 16bit, 2ch, E-on | 0 | REPRODUCTION TIME OF TRACK |
| 1 | 5 | 90001 | 100000 | 48k, 16bit, 2ch, E-on | 0 | REPRODUCTION TIME OF TRACK |
| 1 | 6 | 100001 | 110000 | 48k, 16bit, 2ch, E-on | 0 | REPRODUCTION TIME OF TRACK |
| 2 | | | | | | TOTAL REPRODUCTION TIME OF GROUP 2 |
| 2 | 1 | 1000000 | 1010000 | 96k, 24bit, 3ch, E-on | 0 | REPRODUCTION TIME OF TRACK |
| 2 | 2 | 1010001 | 1020000 | 96k, 24bit, 3ch, E-off | 0 | REPRODUCTION TIME OF TRACK |
| 2 | 3 | 1020001 | 1030000 | 96k, 24bit, 3ch, E-off | 0 | REPRODUCTION TIME OF TRACK |
| 2 | 4 | 1030001 | 1040000 | 96k, 24bit, 3ch, E-off | 0 | REPRODUCTION TIME OF TRACK |
| 3 | | | | | | TOTAL REPRODUCTION TIME OF GROUP 3 |
| 3 | 1 | 50000 | 60000 | 48k, 16bit, 2ch, E-on | 1(1-1) | REPRODUCTION TIME OF TRACK |
| 3 | 2 | 2010001 | 2020000 | 96k, 20bit, 4ch, E-on | 0 | REPRODUCTION TIME OF TRACK |
| 3 | 3 | 1010001 | 1020000 | 96k, 24bit, 3ch, E-off | 1(2-2) | REPRODUCTION TIME OF TRACK |
| 3 | 4 | 2020001 | 2030000 | 96k, 20bit, 4ch, E-on | 0 | REPRODUCTION TIME OF TRACK |
| 3 | 5 | 90001 | 100000 | 48k, 16bit, 2ch, E-on | 1(1-5) | REPRODUCTION TIME OF TRACK |
| 4 | | | | | | TOTAL REPRODUCTION TIME OF GROUP 4 |
| 4 | 1 | 60001 | 70000 | 48k, 16bit, 2ch, E-on | 1(1-2) | REPRODUCTION TIME OF TRACK |
| 4 | 2 | 1010001 | 1020000 | 96k, 24bit, 3ch, E-off | 1(2-2) | REPRODUCTION TIME OF TRACK |
| 4 | 3 | 2010001 | 2020000 | 96k, 20bit, 4ch, E-on | 1(3-2) | REPRODUCTION TIME OF TRACK |
| 4 | 4 | 80001 | 90000 | 48k, 16bit, 2ch, E-on | 1(1-4) | REPRODUCTION TIME OF TRACK |

AUDIO INFORMATION RECORDING MEDIUM AND AUDIO INFORMATION REPRODUCING APPARATUS

BACKGROUND OF THE INVENTION

1. Field of the Invention

The present invention relates to an information recording medium such as a DVD, on which a large amount of information such as images, sound, etc. can be recorded densely, and a reproducing apparatus to reproduce the information recorded on the information recording medium.

2. Description of the Related Art

An LD (Laser Disk), a CD (Compact Disk), etc. are popular as an optical disc to record information such as images, sound, etc. thereon.

On such an LD or CD etc, image information and audio information are recorded together with time information, which represents a time to reproduce each of the image information and audio information on the basis of the reproduction starting point. Therefore, in the case of CD, it is possible not only to reproduce the audio information in order of the recording arrangement but also to reproduce only some pieces of audio information that the user wants to listen. Furthermore, it is possible to reproduce audio information in random order.

However, the user have no choice with respect to contents of images to be displayed or contents of sound to be reproduce. For example, when watching pictures or movies, the user cannot choose the subtitles. When listening music, the user cannot choose the sound, voice or language (e.g. lyrics). This is a disadvantage of the conventional optical disc, LD or CD. That is, the LD or CD does not has the capability of interactive selection or the capability that many choices are given to the user.

On the other hand, a DVD, which is a kind of optical disk, has been proposed and now actively developed. The DVD has the same size as that of the CD, and has a recording capacity that is about ten times as large as that of the CD. If such a DVD is used, a number of subtitles and a number of lyrics can be recorded on it, and it makes possible to allow the user to choose the subtitles or lyrics. That is, according to the DVD, it is possible to achieve the interactive selection and to give many choices to the user.

If audio information such as music etc. is recorded on the DVD, the audio information whose amount is as large as the total amount of audio information recorded on several CDs can be recorded on it, since the DVD has a large amount of recording capacity. Hereinafter, a DVD on which audio information is mostly recorded is referred to as an "audio DVD".

For example, if an audio DVD is produced with respect to one musician, all of the songs included in several CD albums produced by this musician can be recorded on this one audio DVD. Furthermore, it is possible to select several songs from these CD albums on the basis of a certain theme and add them as a song collection album onto the same audio DVD.

More concretely, if an audio DVD is produced with respect to the Beatles, all of the songs included in several CD albums produced by the Beatles can be recorded on this one audio DVD. Furthermore, it is possible to select several songs that the lead vocal is John Lennon from these CD albums and add them as "John Lennon Vocal Collection Album" onto the same audio DVD.

In this case, the same song is recorded doubly on one audio DVD. For example, the song, "Let It Be", is recorded as a song included in the album whose title is "Let It Be", and this song is further recorded as a song included in the "John Lennon Vocal Collection Album".

It is useless to record the same song more than one time. That is, recording the audio information having same contents onto one DVD is in vain.

SUMMARY OF THE INVENTION

It is therefore an object of the present invention to provide an information recording medium which can use its recording capacity efficiently by preventing to record audio information having the same content more than one time, and which can provide the user with the aforementioned interactive selection and many choices.

The above mentioned object can be achieved by an information recording medium in accordance with the present invention. The information recording medium has: a plurality of audio information which are independent of each other; and a plurality of reproducing control information to be used for reproducing the plurality of audio information. Each of the plurality of reproducing control information is assigned to any one of the plurality of audio information. The plurality of reproducing control information includes double reproducing control information. The double reproducing control information is assigned to one of the plurality of audio information to which different one of the plurality of reproducing control information has been assigned.

Thus, the double reproducing control information and another reproducing control information are doubly assigned to one audio information. If this audio information is reproduced according to the double reproducing control information and the reproducing control information, this audio information is doubly reproduced. Therefore, it is not needed to doubly record the same audio information on one information recording medium, and it is possible to record the audio information efficiently.

In the information recording medium may include a first information group having a set of the reproducing control information except the double reproducing control information, and a second information group having a set of the reproducing control information including the double reproducing control information. According to the information recording medium of the present invention, these information groups can be defined efficiently.

In the aforementioned information recording medium, the information recording medium may further have centralized reproducing control information which includes all of the plurality of reproducing control information. Therefore, all of the reproducing control information can be obtained by referring to the centralized reproducing control information, so that it is possible to make the reproducing process simple. As a result, the reproducing process can be carried out rapidly.

In the aforementioned information recording medium, each of the plurality of reproducing control information includes address information which indicates a recording position of one of the plurality of audio information. The double reproducing control information and the reproducing control information except the double reproducing control information include the same address information as each other. Therefore, by referring the address information of the audio information corresponding to each reproducing control information, the reproducing control information assigned to the doubled audio information can be found easily.

In the aforementioned information recording medium, the centralized reproducing control information may include double assignment information which indicates whether or not the reproducing control information is the double reproducing control information. Therefore, it is possible to easily determined whether or not the reproducing control information is the double reproducing control information by referring to the double assignment information.

In the aforementioned information recording medium, the centralized reproducing control information may include attribute information, and the attribute information may include at least information which indicates a recording position of one of said plurality of audio information, a sampling frequency and the number of bit of quantization with respect to each of the plurality of audio information. Therefore, the attributes of the audio information corresponding to all the reproducing control information can be easily obtained by referring to the attribute information included in the centralized reproducing control information.

In the aforementioned information recording medium, the centralized reproducing control information may be recorded in a lead in area of the information recording medium. The lead in area is firstly read-out by the reproducing apparatus. Therefore, the centralized reproducing control information can be rapidly obtained, and thereafter, the reproducing process can be rapidly and efficiently carried out.

The above mentioned object can be also achieved by a first reproducing apparatus in accordance with the present invention. The first reproducing apparatus is an apparatus for reproducing an information recording medium. The information recording medium has: a plurality of audio information which are independent of each other; a plurality of reproducing control information to be used for reproducing the plurality of audio information; and centralized reproducing control information which includes all of the plurality of reproducing control information. Each of the plurality of reproducing control information is assigned to any one of the plurality of audio information. The plurality of reproducing control information includes double reproducing control information, which is assigned to one of the plurality of audio information to which different one of the plurality of reproducing control information has been assigned. The centralized reproducing control information includes double assignment information which indicates whether or not the reproducing control information is the double reproducing control information. The first reproducing apparatus has: a reading device for reading information including the plurality of audio information, the plurality of reproducing control information and the centralized reproducing control information from the information recording medium; an input device for inputting an instruction to select either of a normal reproduction and a non-double reproduction; and a reproducing device for referring the centralized reproducing control information read by the read device, and reproducing the plurality of audio information. The reproducing device, if the normal reproduction is selected, reproduces the plurality of audio information according to all of the plurality of reproducing control information, and the reproducing device, if the non-double reproduction is selected, refers the double assignment information and reproduces the plurality of audio information according to the plurality of reproducing control information except the double reproducing control information.

In this first reproducing apparatus, when an instruction to indicate either normal reproduction or non-double reproduction is input by the user, the first reproducing apparatus refers the centralized reproducing control information, and reproduces the audio information. If the normal reproduction is indicated, the first reproducing apparatus reproduces the audio information according to all the reproducing control information included in the centralized reproducing control information. On the other hand, if the non-double reproduction is indicated, the first reproducing apparatus refers the double assignment information, and reproduces the audio information according to the reproducing control information except the double reproducing control information. Thus, the audio information can be reproduced by the appropriate reproducing process (i.e., reproduction mode), depending on the user's selection.

The above mentioned object can be also achieved by a second reproducing apparatus of the present invention. The second reproducing apparatus is an apparatus for reproducing an information recording medium. The information recording medium has: a plurality of audio information which are independent of each other; a plurality of reproducing control information to be used for reproducing the plurality of audio information; and centralized reproducing control information which includes all of the plurality of reproducing control information. Each of the plurality of reproducing control information is assigned to any one of the plurality of audio information. The plurality of reproducing control information includes double reproducing control information, which is assigned to one of the plurality of audio information to which different one of the plurality of reproducing control information has been assigned. The centralized reproducing control information includes address information which indicates a recording position of one of the plurality of audio information. The second reproducing apparatus has: a reading device for reading information including the plurality of audio information, the plurality of reproducing control information and the centralized reproducing control information from the information recording medium; an input device for inputting an instruction to select either of a normal reproduction and a non-double reproduction; a reproducing device for referring the centralized reproducing control information read by the read device, and reproducing the plurality of audio information; and a storage device for storing the address information of the audio information that has been previously reproduced by the reproducing device. The reproducing device, if the normal reproduction is selected, reproduces the plurality of audio information according to all of the plurality of reproducing control information, and the reproducing device, if the non-double reproduction is selected, refers the address information in the storage device and reproduces the plurality of audio information according to the reproducing control information assigned to the audio information whose address information has not been stored in the storage device.

In this second reproducing apparatus, when an instruction to indicate either normal reproduction or non-double reproduction is input by the user, the second reproducing apparatus refers the centralized reproducing control information, and reproduces the audio information. If the normal reproduction is indicated, the second reproducing apparatus reproduces the audio information according to all the reproducing control information included in the centralized reproducing control information. On the other hand, if the non-double reproduction is indicated, the second reproducing apparatus refers the audio information in the storage device, and determines whether or not the address information of the audio information corresponding to the reproducing control information has not been stored in the storage device. Then, the second reproducing apparatus reproduces the audio information according to the reproducing control information assigned to the audio information whose address information has not been stored in the storage device. Thus, the audio information can be reproduced by the appropriate reproducing process (i.e., reproduction mode), depending on the user's selection.

In the aforementioned first or second reproducing apparatus, the centralized reproducing control information includes a first total reproduction time in a case of the normal reproduction and a second total reproduction time in a case of the non-double reproduction. The first or second reproducing apparatus further has a displaying device for displaying either of the first total reproduction time and the second total reproduction time. Therefore, the total reproduction time can be displayed before the reproduction is actually carried out.

The above mentioned object can be also achieved by another information recording medium in accordance with the present invention. The information recording medium has: a plurality of audio information each corresponding to any one of a plurality of song to be reproduced independently; a plurality of reproducing control information to be used for reproducing the plurality of audio information; and a title group information for defining a plurality of title groups each of which is a set of the plurality of songs. Each of the plurality of reproducing control information is assigned to any one of the plurality of audio information. the same song is doubly included in more than one of the plurality of title groups.

In this information recording medium, the title group is defined in such a way that the same song is doubly included in more than one title group, and only one audio information corresponding to this song is recorded on the information recording medium. Therefore, it is not needed to record the same audio information doubly, and various relations between the title group and songs can be produced.

The above mentioned object can be also achieved by a third reproducing apparatus. The third reproducing apparatus is an apparatus for reproducing an information recording medium. The information recording medium has: a plurality of audio information each corresponding to any one of a plurality of song to be reproduced independently; a plurality of reproducing control information to be used for reproducing the plurality of audio information; and a title group information for defining a plurality of title groups each of which is a set of the plurality of songs. Each of the plurality of reproducing control information is assigned to any one of the plurality of audio information. The same song is doubly included in more than one of the plurality of title groups. The third reproducing apparatus has: a reading device for reading information including the plurality of audio information, the plurality of reproducing control information and title group information; and a reproducing device for referring to the title group information, and reproducing all of the plurality of songs included in each of the plurality of title group according to the reproducing control information.

According to the third reproducing apparatus, all of the songs included in each title group can be reproduced according to the definition of each title group.

The above mentioned object can be also achieved by a fourth reproducing apparatus. The fourth reproducing apparatus is an apparatus for reproducing an information recording medium. The information recording medium has: a plurality of audio information each corresponding to any one of a plurality of song to be reproduced independently; a plurality of reproducing control information to be used for reproducing the plurality of audio information; and a title group information for defining a plurality of title groups each of which is a set of the plurality of songs. Each of the plurality of reproducing control information is assigned to any one of the plurality of audio information. The same song is doubly included in more than one of the plurality of title groups. The forrth reproducing apparatus has: a reading device for reading information including the plurality of audio information, the plurality of reproducing control information and title group information; an identifying device for referring to the title group information, and for identifying the song that is doubly included in more than one of the plurality of title groups; and a reproducing device for reproducing the audio information corresponding to each of the plurality of songs according to the reproducing control information. The reproducing device reproduces the audio information except audio information that has been previously reproduced.

According to the fourth reproducing apparatus, when the songs included in the different title groups are reproduced, it is prevented that the same song is reproduced repeatedly.

The nature, utility, and further feature of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, an embodiment of the present invention will be now described. In the description set forth hereinafter, the present invention is embodied in an audio DVD and an audio DVD reproducing apparatus.

In addition, in the following list, a number of terms described in the claims of this application are listed on the left side, a number of terms described in the embodiment are listed on the right side. The terms on the left side and the right side are corresponding to each other, and the terms on the right side are examples of the respective terms on the left side.

| | |
|---|---|
| Audio Information: | Audio Information corresponding to Track (i.e. AOB) |
| Reproducing Control Information: | Address Information in each track of Centralized Audio Information, or APGCI |
| Centralized Reproducing Control Information: | Centralized Audio Information |
| Double Reproducing Control Information: | Address Information, Attribute Information corresponding to Doubled Track |
| Double Assignment Information: | Double Flag |
| Title Group Information: | Logical Information defining Title Group (i.e. AMG) |

I. Information Recording Medium

Firstly, an embodiment of an information recording medium of the present invention will be described.

(1) Physical Format and Logical Format of Audio DVD (1-A) Physical Format

A physical format of the record format on the audio DVD is explained with reference to FIG. 1.

Figure 1:
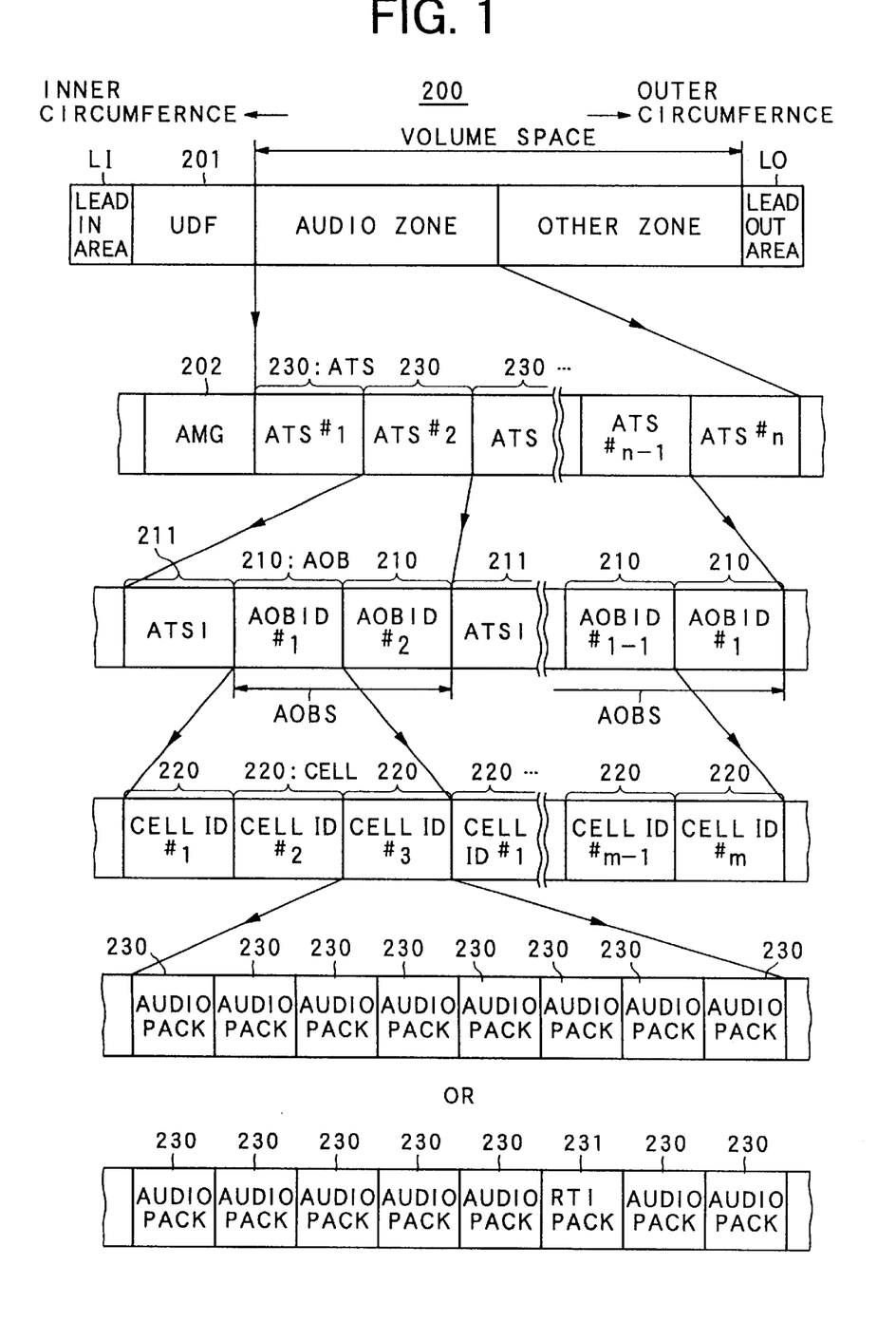
FIG. 1 is a diagram showing a physical format of an audio DVD of an embodiment of the present invention.

As shown in FIG. 1, an audio DVD 200 as an embodiment is provided with the lead in area LI at its most inner circumferential portion and the lead out area LO at its most outer circumferential portion, between which one volume space is recorded. Within the volume space, an audio zone is always recorded. In this audio zone, the audio information is recorded such that it is divided into a plurality of ATSs (Audio Title Sets) 230, each of which has a unique ID (Identification) number (i.e. ATS #1 to ATS #n).

At the outer circumference side of the lead in area LI, a UDF (User Disc Format) 201 for managing the format of the file recorded on the audio DVD 200 is recorded, and, next to it, an AMG (Audio Manager) 202 is recorded. As the information recorded in the AMG 202, for example, information related to the whole audio information recorded on the audio DVD 200, such as a menu for showing a name of each item, information for preventing an illegal copy, an access table for directly accessing each title and so on, is recorded.

One ATS 230 is recorded such that it is divided into a plurality of AOBs (Audio Objects) 210, each of which has an ID number (AOB ID#1, AOB ID#2, . . . ), and ATSI (Audio Title Set Information) 211 disposed ahead of the AOBs 210.

Figure 3:
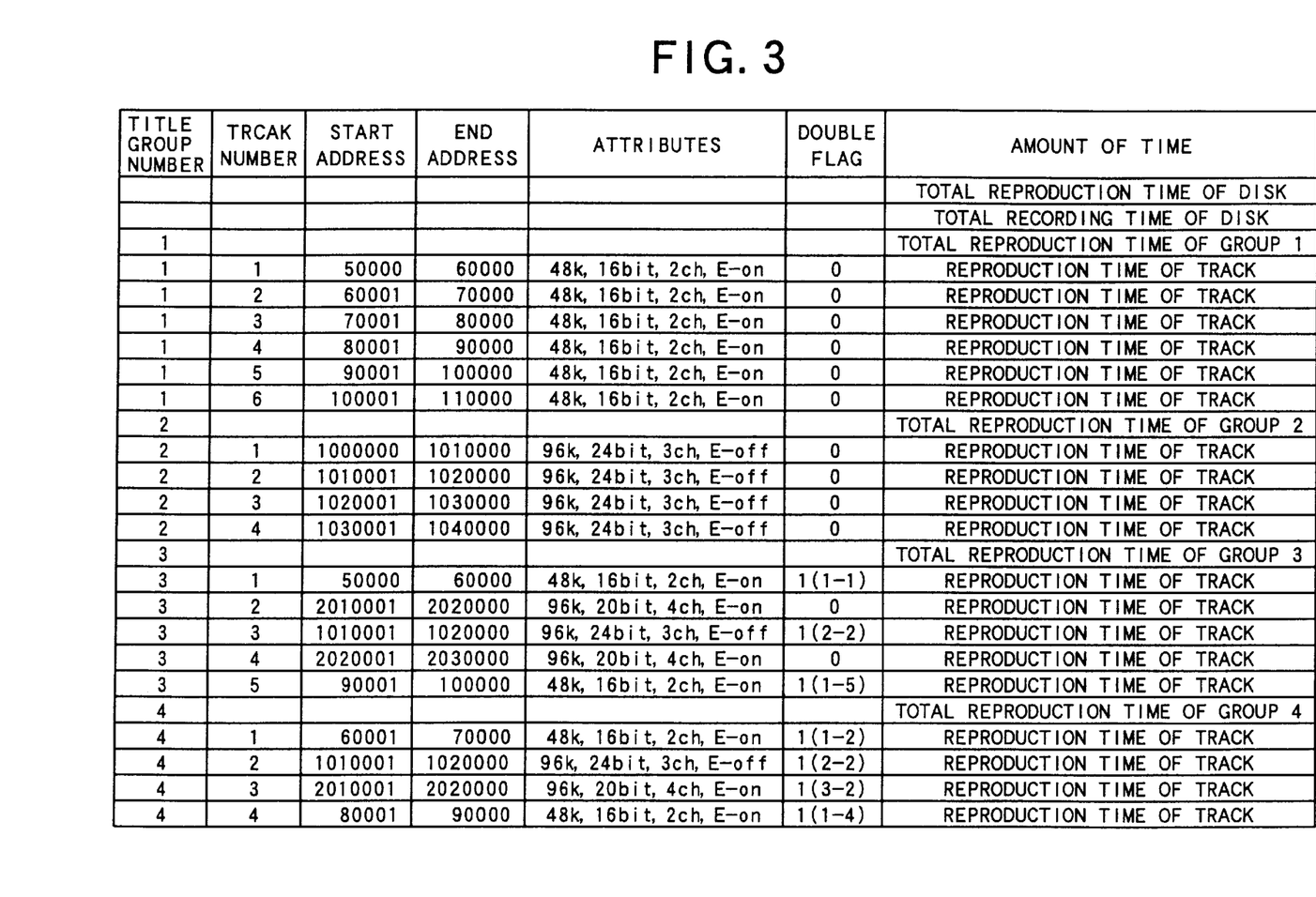
FIG. 3 is a diagram showing an example of a centralized audio information of the embodiment of the present invention.

Here, a data portion constructed by a plurality of AOBs 210 is defined as an AOB set (AOBS) as shown in FIG. 3. The AOB set is the substantial portion of the audio information, while the ATS 211 is the managing and controlling information of the AOB set consisting of a plurality of AOBs 210.

In the ATSI 211 recorded at the head of the ATS 230, information such as APGCI (Audio ProGram Chain Information), which is various information related to a program chain as a logical division obtained by combining a plurality of cells (the "cell" will be described later in detail), is recorded. In each AOB 210, the substantial portion of the audio information (i.e. the audio information itself other than control information) besides the control information is recorded.

One cell 220 consists of a plurality of audio packs 230 each of which has been packed, or an audio pack 230 and real time information pack 231. The audio pack 230 is a data pack into which the audio information to be recorded onto the audio DVD has been packed by each predetermined size, and includes audio information digitized by a linear PCM for example. In the real time information pack 231, text information, BPM (Beat Per Minutes) information, hand clap information and the like are included.

In the above explained record format having a hierarchical structure as shown in FIG. 3, each division can be freely set according to the author's intention, so as to perform recording the record information onto the audio DVD 200 on the basis of these set divisions. By performing the reproduction on the basis of a later described logical structure for each of these divisions, the variegated reproduction can be performed.

(1-B) Logical Format

Next, a logical format (logical structure) constructed by combining the information recorded by the physical divisions shown in FIG. 1 is explained with reference to FIG. 2.

Figure 2:
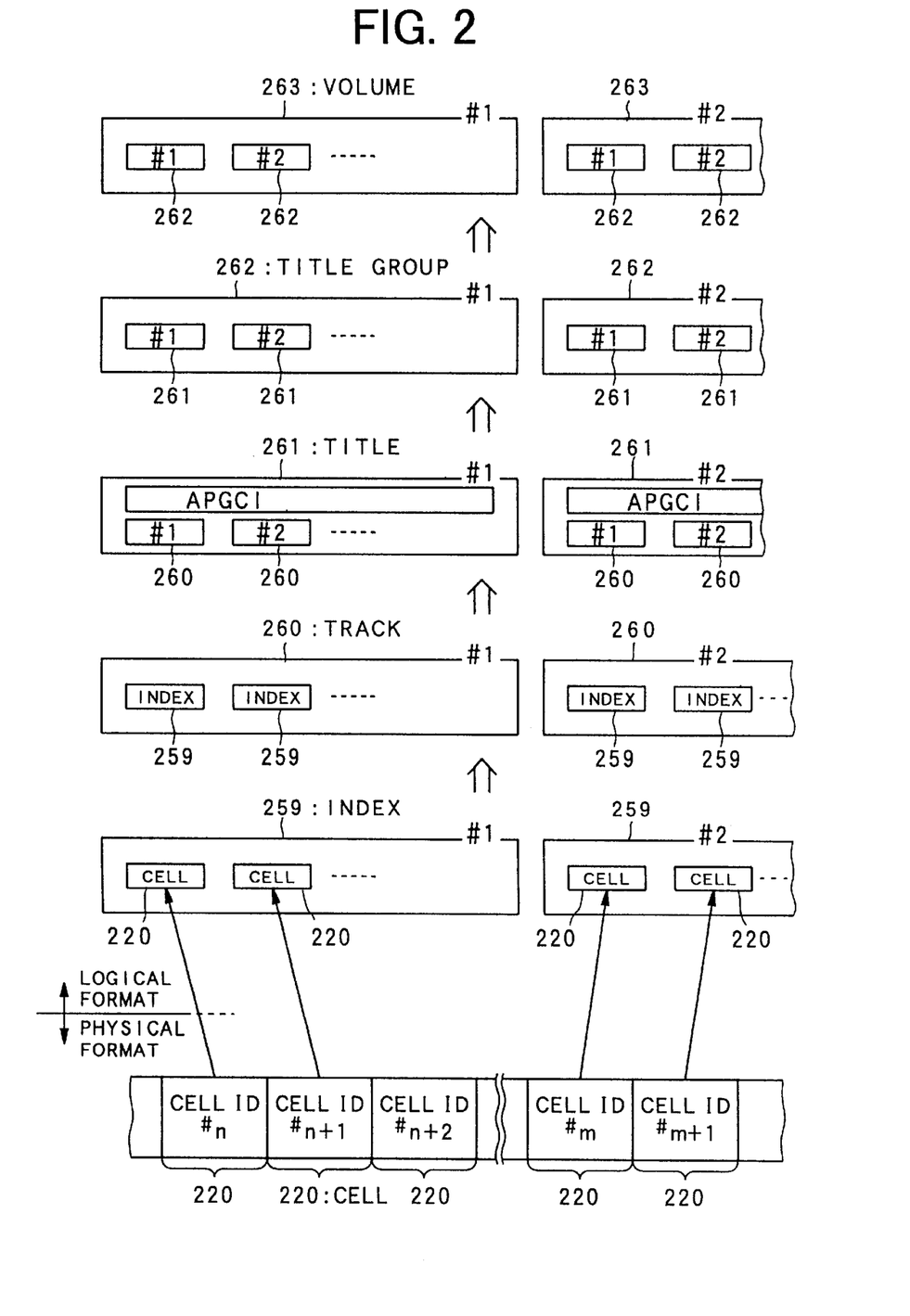
FIG. 2 is a diagram showing a logical format of the audio DVD.

The information is not actually recorded on the audio DVD 200 in the logical structure of FIG. 2. Instead, the audio information is recorded on the audio DVD in the physical format shown in FIG. 1, and the information to reproduce the audio information is recorded in the aforementioned AMG 202 and the ATSI 211 in the logical format shown in FIG. 2.

To make the explanation clear, the following explanation is made from the lower hierarchical layer in FIG. 2. An index 259 is constructed by selecting and combining one cell 220 or a plurality of cells 220 among the physical structure explained with reference to FIG. 1. The index 259 can be used as the music number, and is the minimum unit which can be accessed by the user.

By one or a plurality of indexes 259, one track 260 is logically constructed. The track 260 is an information unit corresponding to one music composition. The user can select an arbitrary track (music composition) and directly access it.

Here, as for the number of each cell 220, at a time of treating the cell 220 on the physical format shown in FIG. 3, the number is treated as the cell ID number (which is indicated by cell ID # in FIG. 3). On the other hand, at a time of treating the cell 220 on the logical format shown in FIG. 4, the number is treated as the cell number in the order of description in the APGCI described later.

The track (music composition) 260 is an information unit including a plurality of cells, and is a group of cells having certain common attributes to each other. Namely, the attributes of all of the cells in one track 260 are the same to each other. Further, all of the cells included in the track 260 are recorded adjacent to each other within the same object.

One title 261 is logically constructed of one track 260 or a plurality of tracks 260. However, the title 261 itself is not recognized as a unit of access by the user. Therefore, it is not possible to access an arbitrary title by specifying the title number.

In case of the audio DVD, the attribute of each track 260 constructing the title 261 can be defined independently within 8 patterns at the maximum. Namely, the attribute as the audio information such as the channel number, the quantization method, the sampling frequency and the like may be changed for each track (i.e., each music composition).

The aforementioned APGCI is defined by the unit of this title 261. In the APGCI, the attribute of each track 260, the reproduction order of the cells 220 in each track 260 when reproducing each track 260, the address which is the recording position of each cell 220 on the audio DVD 220, the number of the cell 220 at the head to be reproduced on one track 260, the reproducing method of each track 260 and various commands are included.

In one title 261, the substantial audio information is included as the combination of the tracks 260 (i.e., the combination of the cells 220) other than the above mentioned APGCI.

One title group 262 is logically constructed by one or a plurality of titles 261. The title group 262 is the maximum unit which the user can access, and can be defined up to 9 groups at the maximum within one volume. This title group 262 is constructed by one or a plurality of titles 261 which are collected on the basis of a certain relationship, and all of the titles 261 within the title group 262 are continuously reproduced. For example, it is possible to collect as one title group the music compositions of a particular singer, a particular composer or the like.

One volume 263 is logically constructed by one or a plurality of title groups 262. The volume 263 is an information unit corresponding to one album (DVD).

Figure 4:
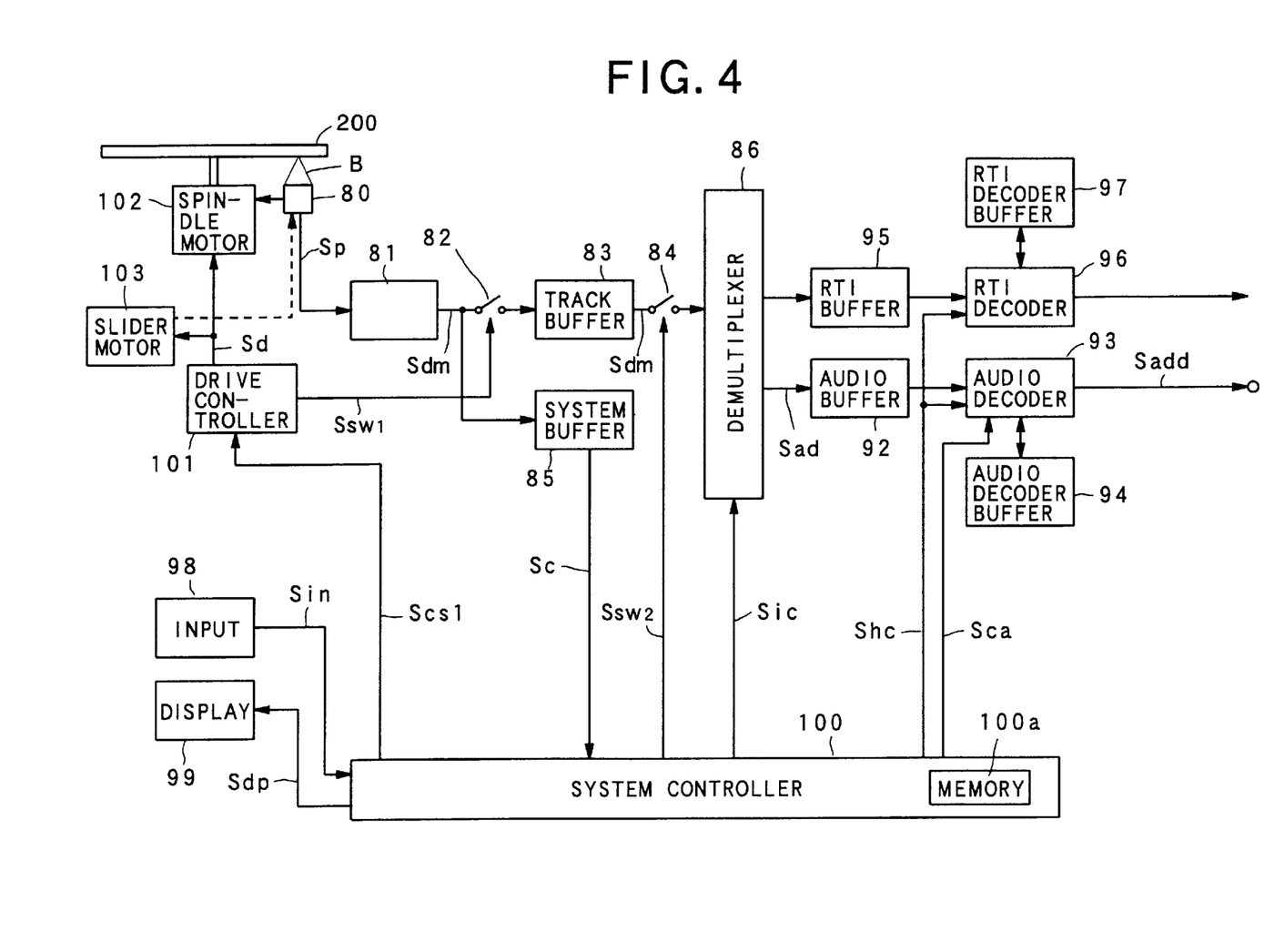
FIG. 4 is a block diagram showing an audio DVD reproducing apparatus of the embodiment of the present invention.

The actual audio information included in one title shown in FIG. 4 is recorded within one ATS 230 shown in FIG. 3 on the audio DVD.

As the author specifies the information divided in the physical structure on the audio DVD 200 on the basis of the above described logical format, the music for the audience to listen to is to be formed.

(2) Contents of Audio Information

Next, contents of audio information recorded on the audio DVD will be roughly explained. The audio DVD has a great amount of recording capacity, as compared with the CD. Audio information whose amount is as large as the total amount of audio information recorded on several CDs can be recorded on one audio DVD. Here, a set of audio information corresponding to one CD album corresponds to the aforementioned title group 262.

For example, an audio DVD on which several CD albums produced by the Beatles are recorded will be given as an example. On this audio DVD, all the songs included in several Beatles' albums (e.g. four albums), such as "Let It Be", "Abbey Road", etc. The audio information corresponding to one album is recorded as one title group. For example, the album, "Let It Be", is recorded as the title group #1, and the album, "Abbey Road", is recorded as the title group #2.

In the aforementioned example, one CD album corresponds to one title group. Additionally, it is possible to select several pieces of audio information from among all of the audio information recorded on the audio DVD on the basis of a certain theme, and assign them to one title group.

For example, four title groups #1 through #4 corresponding to respective CD albums are recorded on the audio DVD. Furthermore, other than these title groups, it is possible to select several songs that the lead vocal is John Lennon from these CD albums and add them as "John Lennon Vocal Collection Album" onto the same audio DVD. Also, it is possible to select several songs that the lead vocal is Paul McCartney and add them as "Paul McCartney Vocal Collection Album" onto the same audio DVD. In this case, the "John Lennon Vocal Collection Album" is assigned to the title group #5, and the "Paul McCartney Vocal Collection Album" is assigned to the title group #6.

In this case, all the songs included in the title groups #5 and #6 are included in the title groups #1 through #4. When any song included in the title group #5 or #6 is chosen to be reproduced, a song included in the title group #1, #2, #3 or #4 is actually reproduced. That is, the user gets the impression that the two same pieces of audio information exist, one is included in the title group #5 or #6, and the other is included in the title group #1, #2, #3 or #4. However, the only one piece of audio information exists actually. All the pieces of audio information are different from each other. That is, audio information is not double recorded on one audio DVD.

Since audio information is not double recorded on one audio DVD, it is possible to use the recording capacity of the audio DVD efficiently. Thus, the audio information included in the title group #5 or #6 is recorded on each ATS 230 of the audio DVD as the audio information corresponding to the songs included in the title group #1, #2, #3 or #4. The reproduction of the songs included in the title group #5 or #6 is performed by actually reproducing the audio information included in each ATS 230, while referring to the reproducing control information in this title group (in this case, the reproducing control information described in the AMG and ATSI).

In addition, a set of several pieces of audio information selected on the basis of a certain theme, such as the "John Lennon Vocal Collection Album" or the "Paul McCartney Vocal Collection Album", is referred to as a "collection". That is, the "collection" is a title group which includes audio information to which a different title group other than own title group is further assigned.

Furthermore, the title group is a set of several songs that can be recognized by the user. In the aforementioned example, the title groups #1 through #4, which correspond to four CD albums, and the title groups #5 and #6, which correspond to two "collections", are included in one audio DVD. If the song title list is attached to this audio DVD, the song titles of the songs included in the six different CD albums are listed on it. Actually, the substantial audio information included in the title group #5 or #6 is the audio information of the song included in any one of the title groups #1 trough #4 corresponding to the four CD albums, and this audio information is not doubly recorded on this audio DVD. However, the user cannot recognize this fact, but gets impression that six different CD albums are recorded on this audio DVD. The user can recognizes the title group as a set of several songs, regardless of the actual condition of the audio information recorded on the audio DVD.

(3) Centralized Audio Information

Next, a centralized audio information included in the information recorded on the audio DVD will be explained. The centralized audio information is a set of necessary information relative to reproduction of the audio information recorded on the audio DVD. This centralized audio information is recorded on the lead in area LI or the AMG 202.

As mentioned above, in the audio DVD, the substantial audio information is recorded on each ATS 230, and the control information necessary for reproduction of this audio information and the additional information relative to the attributes of this audio information are described in the ATSI 211 in each ATS 230. Therefore, in order to reproduce the audio information included in each title group, it is needed to refer the ATSI in each ATS and obtain the reproducing control information included in the control data included in this ATSI. Generally, in the audio DVD reproducing apparatus, when the audio DVD disk is mounted or inserted, the lead in area LI is read-out firstly, and thereafter, the AMG 202 and the reproducing control information (APGCI) included in the control data of ATSI 211 in each ATS 230 is read-out, and next, these information is stored into the predetermined memory installed in the reproducing apparatus, and thereafter, the substantial audio information is read-out. Thus, when reproducing each song, the reproducing control information (APGCI) of the title group including information of the audio information to be reproduced is obtained from the memory, and the reproduction is performed on the basis of this reproducing control information.

The reproducing control information included in the control data of the ATSI 211 includes not only information necessary for the reproduction of the track but also various other information to realize various functions, such as song number search, special reproduction, etc. However, in the case of a simple reproducing apparatus such as a portable player, some part of the reproducing control information is only used, because the simple reproducing apparatus does not have many functions. Furthermore, the new reproducing control information (APGCI) has to be read-out from the disk and stored into the memory, each time the title is changed. Therefore, in order to know the number of songs recorded on the whole of the disk, the attributes of each song, the presence of the song to which more than one title group is doubly assigned or the like, it is needed to read-out all the reproducing control information (APGCI) and perform the searching and calculation on them. Therefore, this operation takes a long time and leads to inefficiency.

In order to solve this problem, the reproducing control information with respect to all of the tracks (i.e. songs) recorded on the audio DVD disk is recorded in the lead in area LI or AMG 202 as the centralized audio information. Therefore, when any one of the songs included in any one of the title groups is reproduced, the reproducing control information can be easily and rapidly obtained by referring to the centralized audio information. If the centralized audio information is recorded in the lead in area LI, the reproducing control information necessary for reproduction of songs can be obtained immediately after the audio DVD disk is mounted or inserted.

That is to say, the centralized audio information recorded on the lead in area LI or the AMG 202 is a set of the reproducing control information described in the ATSI 211 included in each ATS 230.

FIG. 3 shows an example of the centralized audio information. In the example shown in FIG. 3, the audio DVD has four title groups. These title groups correspond to respective ATSs 230. Concretely, the title group #1 corresponds to ATS #1, and the title group #2 corresponds to ATS #2. As mentioned above, the user recognizes that one title group corresponds to one CD album and thus four different CD album are recorded on one audio DVD.

The centralized audio information includes a start address and an end address with respect to each track (i.e. song). These address may be an absolute address on the audio DVD, or a relative address based on the position where this centralized audio information is recorded.

Furthermore, the centralized audio information includes an audio attribute information. The audio attribute information is information relative to the attributes of the audio information with respect to all the tracks recorded on the audio DVD. Concretely, coding type or methods, sampling frequency, the number of bits of quantization, the number of channels, the presence or absence of emphasis of audio information, etc are included in the centralized audio information. The audio DVD reproducing apparatus automatically adapted for these audio attribute information, and performs reproduction.

In FIG. 3, each of the title groups #3 and #4 corresponds to the aforementioned "collection". Therefore, the user recognizes the title group #3 or #4 as a different CD album from the title group #1 or #2. However, the title group #3 or #4 includes the tracks included in the title group #1 or #2. In the present embodiment, a double flag is used as information relative to the "collection", and this double flag is included in the centralized audio information. The double flag is attached to each track, and indicates a track having a different track other than own track. As shown in FIG. 3, the track that the double flag is "1" (Hereinafter, it is referred to as a "doubled track".) has the same audio information as that of the track included in the other title group. For example, the start address and end address of the track #1 of the title group #3 is equal to those of the track #1 of the title group #1. This means the substantial audio information of the track #1 of the title group #3 is the same as that of the track #1 of the title group #1. Namely, this audio information is recorded at the address 50000-60000, and included in the ATS #1. Therefore, when reproducing the track #1 of the title group #3, the reproducing apparatus reproduces the audio information having the same address as that of the audio information of the track #1 of the title group #1 (i.e., the audio information of the track #1 of the title group #1).

If the double flag is used, it is easily and rapidly determined whether or not each track is the doubled track. However, if the double flag is nor used, this determination is carried out on the basis of comparison of the track address information (i.e., start address and/or end address). For example, in a non-double reproduction (which is described later), when the track is reproduced, it is determined whether or not the same track address information as that of this track has been stored in the memory, and if the same track address information has not been stored, this track address information is stored into the memory, and this track is reproduced. If the same track address information has been stored, this track is not reproduced.

In addition, in FIG. 3, the double flags are described together with numerals representing another track (doubled track) corresponding to this track. For example, the numerals "(1-1)" is described in the column with respect to the double flag of the track #1 of the title group #3. This means the audio information of this track is the same as that of the track #1 of the title group #1.

If the double flag is used, it is prevented to doubly reproduce the same song. This is convenient when the songs recorded on the audio DVD are copied into another recording medium such as MD (Mini Disk). That is, if the double flag is used, it is prevented that the songs recorded on the audio DVD are doubly copied into the MD disk.

More concretely, in the example shown in FIG. 3, if the user inputs the instruction to sequentially reproduce all the songs recorded on the audio DVD from the title group #1 through the title group #4, the same song is reproduced more than one time. Hereinafter, reproducing all the songs recorded on the audio DVD in order of title groups is referred to as "normal reproduction". It is undesirable for some users to reproducing the same song repeatedly. Furthermore, when the all the songs recorded on the audio DVD are copied into the MD disk, it is undesirable that the same song is repeatedly copied.

In such a case, the doubled track is not reproduced by referring to the double flag, or by the comparison of the track address information. Therefore, it is prevented to repeatedly reproduce the same song. That is, all the songs recorded on the audio DVD are sequentially reproduced without repetition. Hereinafter, reproducing all the songs recorded on the audio DVD without repetition is referred to as "non-double reproduction".

Furthermore, the centralized audio information includes reproduction time. Concretely, as shown in FIG. 3, the reproduction time for each track, the total reproduction time for each title group, the total reproduction time of the disk, and the total recording time of the disk. Here, the total reproduction time represents the total amount of time necessary for reproducing all the songs of all the title groups in the normal reproduction. Therefore, if the doubled track exists, the amount of time necessary for repeatedly reproducing the same song is included in the total reproduction time of the disk. In contrast, the total recording time of the disk represents the total amount of time necessary for reproducing the all the songs of all the title groups in the non-double reproduction. That is to say, the amount of time necessary for repeatedly reproducing the same song (doubled track) is not included in the total recording time of the disk. When all the song is copied from the audio DVD into the MD, this total recording time of the disk is conveniently used.

Although, the reproduction time for each track, the total reproduction time for each title group, the total reproduction time of the disk, and the total recording time of the disk are included in the centralized audio information, the only reproduction time for each track may be included in the centralized audio information. In this case, the total reproduction time for each title group, the total reproduction time of the disk, and the total recording time of the disk can be calculated on the basis of the reproduction time for each track. For example, the total reproduction time of the disk can be obtained by adding the reproduction time of all of the tracks included in all the title groups. The total recording time of the disk can be obtained by adding the reproduction time of all of the track included in all the title groups except for the doubled track.

II. Reproducing Apparatus (1) Audio DVD Reproducing Apparatus

Next, an embodiment of an audio DVD reproducing apparatus will be described with reference in FIG. 4.

As shown in FIG. 4, an audio DVD reproducing apparatus is provided with: an optical pickup 80; a demodulate and correct unit 81; stream switches 82 and 84; a track buffer 83; a system buffer 85; a demultiplexer 86; an audio buffer 92; an audio decoder 93; an audio decoding buffer 94; an RTI buffer 95; an RTI decoder 96; an RTI decoding buffer 97; an input unit 98; a display unit 99; a system controller 100; a drive controller 101; a spindle motor 102; and a slider motor 103. The construction shown in FIG. 4 only illustrates the portions related to the audio reproduction of the audio DVD reproducing apparatus. The description and the detailed explanation as for servo circuits to servo-control the optical pickup 80, the spindle motor 102, the slider motor 103 and the like are omitted since they are constructed in the same manner as the conventional arts.

Next, an overall operation of the present embodiment is explained.

The optical pickup 80 includes a laser diode, a polarization beam splitter, an objective lens, a photo-detector and the like not illustrated, and outputs a light beam B as a reproduction light with respect to the DVD 200. The optical pickup 80 receives a reflection light of the light beam B from the DVD 200, and outputs a detection signal Sp corresponding to information pits formed on the DVD 200. At this time, the tracking servo control and the focus servo control are operated with respect to the objective lens etc. of the optical pickup 80 in the same manner as the conventional art so that the light spot of the light beam B can be located precisely at the information track of the DVD 200 and that the light beam B can be focused on the information record surface of the DVD 200.

The detection signal Sp output from the optical pickup 80 is input to the demodulate and correct unit 81, where a signal demodulation process and an error correct process are applied to it to generate a demodulation signal Sdm, which is fed into the stream switch 82 and the system buffer 85.

The opening and closing operation of the stream switch 82, to which the demodulation signal Sdm is input, is controlled by a switch signal Ssw1 from the drive controller 101. When it is closed, the stream switch 82 passes therethrough the input demodulation signal Sdm as it is to the track buffer 83. When it is opened, the demodulation signal Sdm is not output therethrough, so that unnecessary or useless information (signal) is not input to the track buffer 83.

The track buffer 83, to which the demodulation signal Sdm is input, consists of a FIFO (First In First Out) memory, for example. The track buffer 83 temporarily stores the input demodulation signal Sdm, and continuously outputs the stored demodulation signal Sdm when the stream switch 84 is closed.

The opening and closing operation of the stream switch 84, to which the demodulation signal Sdm is continuously input, is controlled by a switch signal Ssw2 from the system controller 100 such that the various buffers at its posterior stage may not be over-flown or, on the contrary, may not become empty to stop the decoding process, in the separating process by the demultiplexer 86.

On the other hand, the system buffer 85, to which the demodulation signal Sdm is input in parallel with the track buffer 83, accumulates the management information (e.g. the VMG 2 etc.,) or the VTSI 11 of each VTS 3 which are detected firstly upon loading the DVD 200 and which are related to the whole information recorded on the DVD 200. Then, the system buffer 85 outputs the accumulated data as a control information Sc to the system controller 100, and temporarily stores the DSI data 51 for each navi-pack 41 during the reproduction, to output it also as the control information Sc to the system controller 100.

The demultiplexer 86, to which the demodulation signal Sdm is continuously input through the stream switch 84, extracts the audio information for each pack from the demodulation signal Sdm, and outputs it to the audio buffer 92 as the audio signal Sad.

The audio buffer 92, to which the audio signal Sad is input, consists of a FIFO memory, for example. The audio buffer 92 temporarily stores the audio signal Sad and outputs it to the audio decoder 93. Then, a reproducing process based on the linear PCM method is applied thereat to the audio signal Sad on the basis of the header control signal Shc, and it is output as a decoded audio signal Sadd to a speaker etc. not illustrated.

The real time information such as the real time text etc., is output from the demultiplexer 86 to the RTI buffer 95. The data temporarily stored in the RTI buffer 95 is output to the RTI decoder 96 on the basis of the control signal Shc output from the system controller 100, so that the lyrics etc., of the song is displayed on the display device which is not illustrated.

If a necessity to temporarily stop the audio sound (i.e., to pause) during the reproduction immediately after the access to a desired information etc., is detected, a pause signal Sca is output from the system controller 100 to the audio decoder 93. Then, the audio decoder 93 temporarily stops the output of the demodulated audio signal Sadd.

Figure 5:
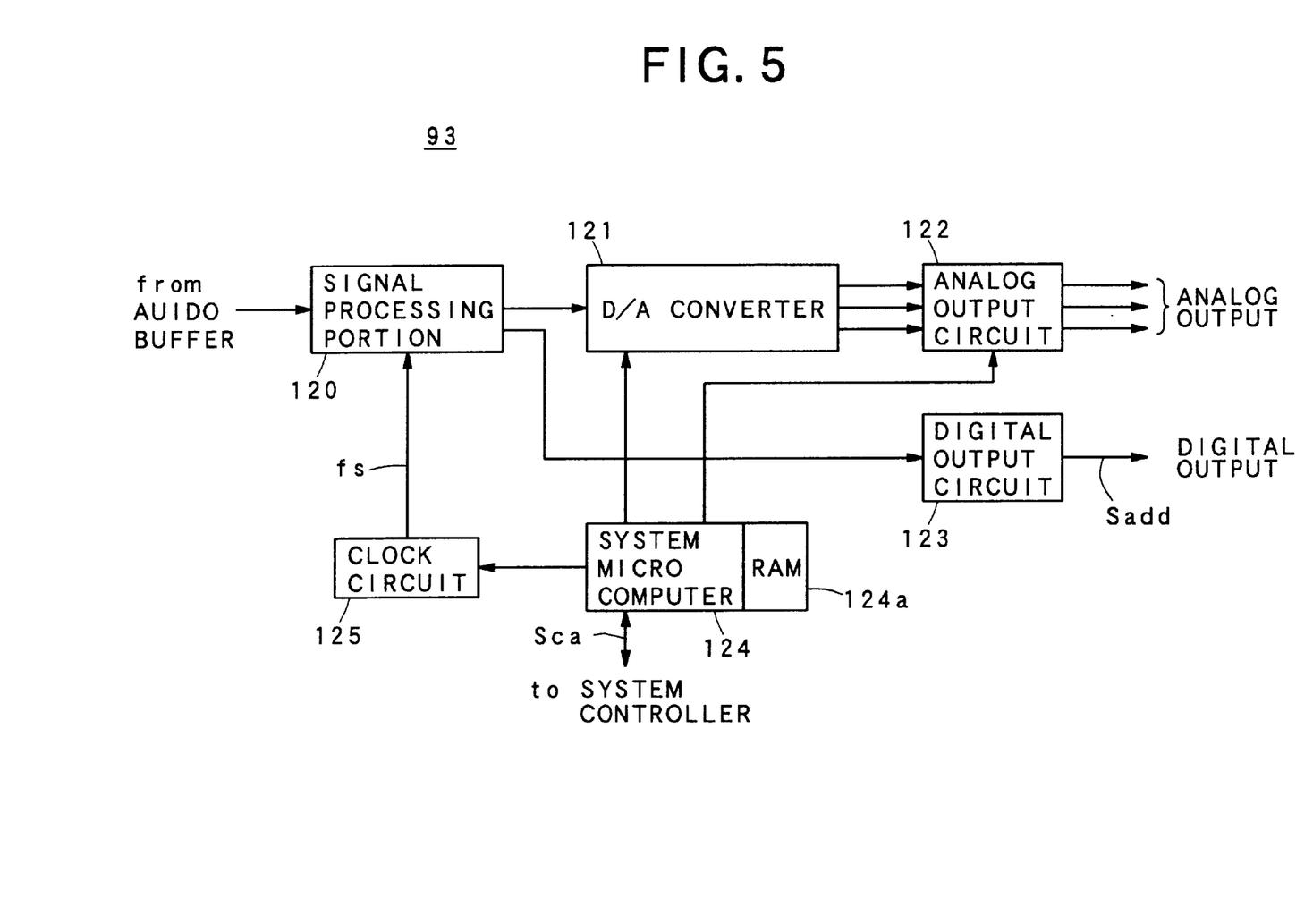
FIG. 5 is a block diagram showing an audio decoder of the audio DVD reproducing apparatus.

Next, a construction and an operation of the audio decoder 93 will be described. FIG. 5 shows a construction of the audio decoder 93. As shown in FIG. 5, the audio decoder 93 has: a signal processing portion 120 including a digital filter etc.; a D/A converter 121; an analog output circuit 122 including an amplifier etc.; a digital output circuit 123; a system micro computer 124 including a RAM 124a; and a clock circuit 125.

The system micro computer 124 is communicated with the system controller 100 by using a control signal Sca, and operates to control the clock circuit 125, the signal processing portion 120, the D/A converter 121 and the analog output circuit 122. The system micro computer 124 has the RAM 124a. The RAM 124a temporarily stores the audio attribute information which is supplied from the system controller 100 as the control signal Sca, and outputs a control signal to the signal processing portion 120, the D/A converter 121, the clock circuit 125, etc.

The signal processing portion 120 operates according to a clock signal fs applied from the clock circuit 120. The signal processing portion 120 decodes the audio signal supplied from the audio buffer 92 and limits the frequency bands, according to information of the coding type or methods, the sampling frequency, the number of bits of quantization, etc. Furthermore, the signal processing portion 120 performs a de-emphasis process according to information of the presence or absence of the emphasis. Then, the signal processing portion 120 outputs the audio signal to the D/A converter 121. The D/A converter 121 divides the input signal into signals corresponding to respective channels according to channel information obtained from the system micro computer 124. Then, the D/A converter 121 converts the signals corresponding to respective channels from digital to analog, and outputs the resultant analog signals to the analog output circuit 122. The analog output circuit 122 amplifies the analog signals to their optimum level for each channel, and outputs them as analog audio signals to speakers (which is not illustrated).

Furthermore, the signal processing portion 120 outputs a digital audio signal Sadd through the digital output circuit 123.

Next, an reproducing operation will be explained. When a track (i.e. song) is designated by the user, the reproducing apparatus refers to audio attribute information included in the centralized audio information in the lead in area LI or the AMG 202, and controls the audio decoder 93 according to the audio attribute information of the designated track.

The track address information of the track on the audio DVD, which is shown in FIG. 3, is also included in the centralized audio information in the AMG 202. Therefore, the system controller 100 sends the a control signal Ssc1 to the drive controller 101 on the basis of the track address information (e.g. start address), and controls the pickup 80 in such a way that the pickup 80 is moved onto the start address. This process is carried out immediately after the user inputs the instruction to reproduce the track. That is, this process is carried out while the control process is carried out in the audio decoder 93.

After the pickup 80 is moved the start address of the designated track, the system controller 100 controls the pickup 80 in such a way that the pickup 80 is stopped temporarily. Thereafter, when the setting of the audio attributes have completed in the audio decoder 93, the reproduction is started. In this manner, the songs are reproduced.

(2) Reproducing Processes of Audio DVD

Next, a first process of the normal reproduction and a first process of the non-double reproduction will be described.

Figure 6:
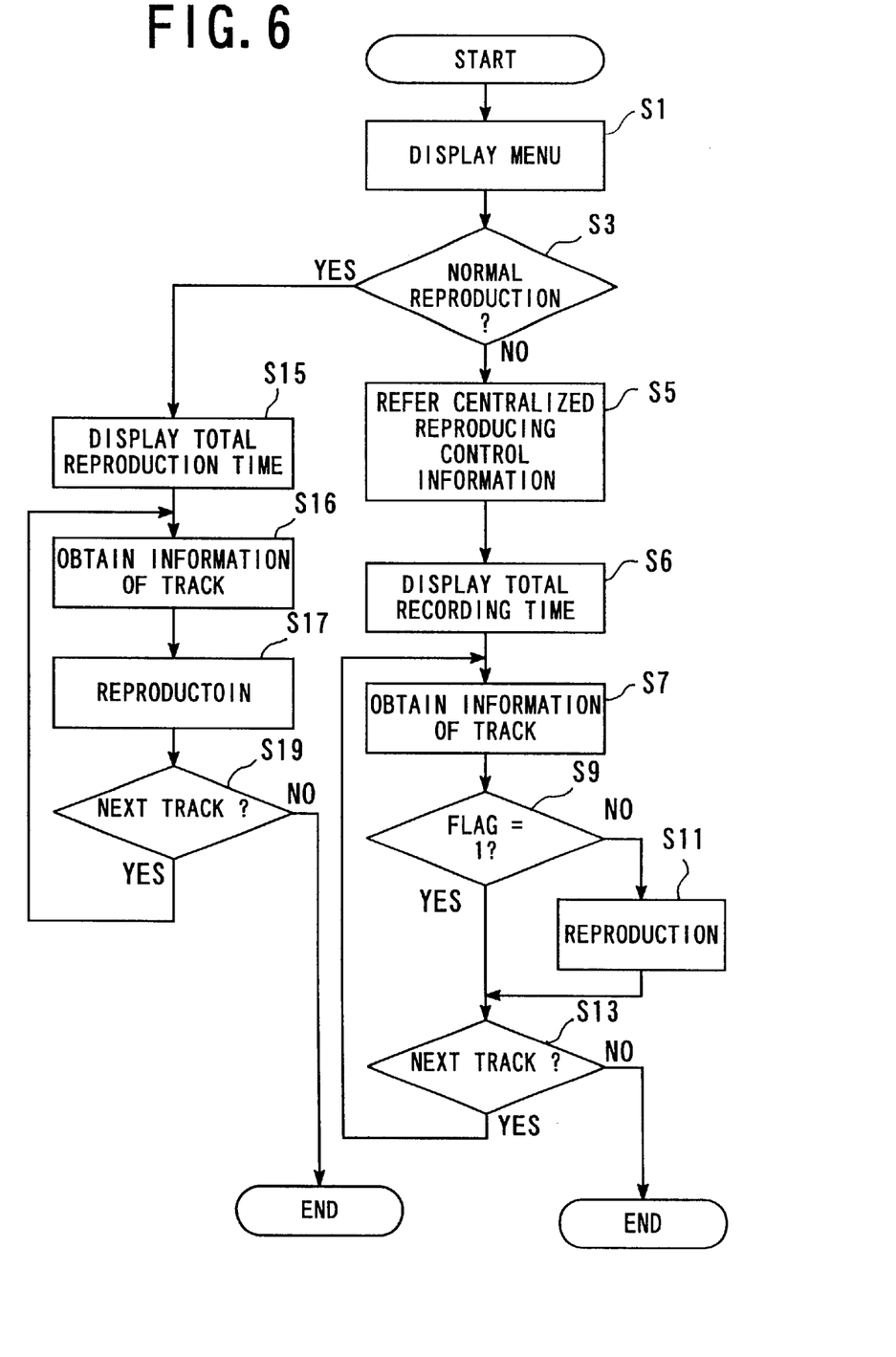
FIG. 6 is a flowchart showing a first process of a normal reproduction and a fist process of a non-double reproduction in the embodiment of the present invention.

Firstly, the first process of the normal reproduction will be described with reference to FIG. 6.

The reproducing apparatus displays the menu etc, and waits for the user to select either of the normal reproduction and the non-double reproduction (step 1). If the user selects the normal reproduction (step 3, YES), the system controller 100 refers to the centralized audio information stored in the internal memory 100a, and then obtains the total reproduction time of the disk from the centralized audio information, and next, displays this total reproduction time onto the display 99 (step 15). Therefore, the user can know the amount of time necessary for the normal reproduction. In addition, the total reproduction time of the disk is calculated on the basis of the reproduction time for each track, as mentioned above.

Next, the system controller 100 obtains the start address, the end address, the attribute information, etc. with respect to the track #1 of the title group #1 (step 16). Next, the system controller 100 controls the drive controller 101 in order to move the pickup 80 onto the start address, and sends the obtained attribute information to the audio decode 93 in order to carried out the setting of the audio attributes. Next, when the setting of the audio attributes has completed in the audio decoder 93, the system controller 100 reproduces the track #1 (step 17). When the reproduction of the track #1 has completed, the system controller 100 determines whether or not the next track exists, by referring to the centralized audio information (step 19). If the next track exists (step 19, YES), the system controller 100 obtains the start address, the end address, the attribute information, etc. with respect to the next track, and reproduces this track (steps 16 and 17). These processes are repeatedly carried out until the last track of the last title group has been reproduced. If the reproduction of the last track of the last title group has completed (step 19, NO), the normal reproduction ends. In this manner, all the tracks are reproduced. If there are the title groups of the "collection" (e.g. title group #3 or #4 in FIG. 3), the track that has been already reproduced as a track of another title group is reproduced again.

Next, the first process of the non-doubled reproduction will be described with reference to FIG. 6.

If the user selects the non-double reproduction (step 3, NO), the system controller 100 refers the centralized audio information stored in the internal memory 100a (step 5), and obtains the total recording time of the disk from the centralized audio information, and next displays this total recording time on the display 99 (step 6). Therefore, the user can know the total amount of time necessary for reproducing all the tracks recorded on the disk without repetition. If the user copies all the tracks into the another recording medium such as an MD, a cassette tape, etc., the user can confirm the recording time.

Next, the system controller 100 obtains the start address, the end address, the double flag, the attribute information, etc. (step 7), and determined whether or not the double flag is "1" (step 9). If the double flag is not "1" the system controller 100 reproduces the track (step 11). More concretely, the system controller 100 controls the drive controller 101 in order to move the pickup 80 onto the start address, and sends the obtained attribute information to the audio decoder 93 in order to carried out the setting of the audio attributes. Thereafter, the system controller 100 reproduces the track.

On the other hand, if the double track is "1" (step 9, NO), the system controller 100 does not reproduce the track, because the track has been already reproduced. Then, the system controller 100 determines whether or not the next track exists (step 13). If the next track exists, the system controller 100, at step 7, confirms the double flag corresponding to the next track, and the aforementioned reproducing operation is repeatedly carried out depending on the double flag. As a result, the only tracks that the double track is "0" are reproduced. If the reproduction of all the tracks has completed (step 13, NO), the non-doubled reproduction ends.

In this manner, each track is reproduced one time, with respect to all of the tracks recorded on the DVD disk. In the example shown in FIG. 3, all of the tracks of the title group #1 and all of the tracks of the title group #2 are firstly reproduced. Then, the tracks 2 and 4 of the title group #3 are secondly reproduced. The other tracks of the title group #3 or all the tracks of the title group #4 are not reproduced, since these tracks are the doubled track.

Next, a second process of the normal reproduction and a second process of the non-double reproduction will be described. Although the double flag is used in the first process the normal reproduction and the first process of the non-double reproduction, the double flag is not used in the second process of the normal reproduction and the second process of the non-double reproduction. In the second processes, the system controller 100 determines on the basis of comparison of the track address information whether or not each track is the doubled track. More concretely, the track address information of the track that has been previously reproduced is stored in the memory 100a of the system controller 100. When the track is reproduced, the system controller 100 determines whether or not the corresponding track address information has been stored in the memory 100a. Hereinafter, these processes will be explained in detail with reference to FIG. 7.

Figure 7:
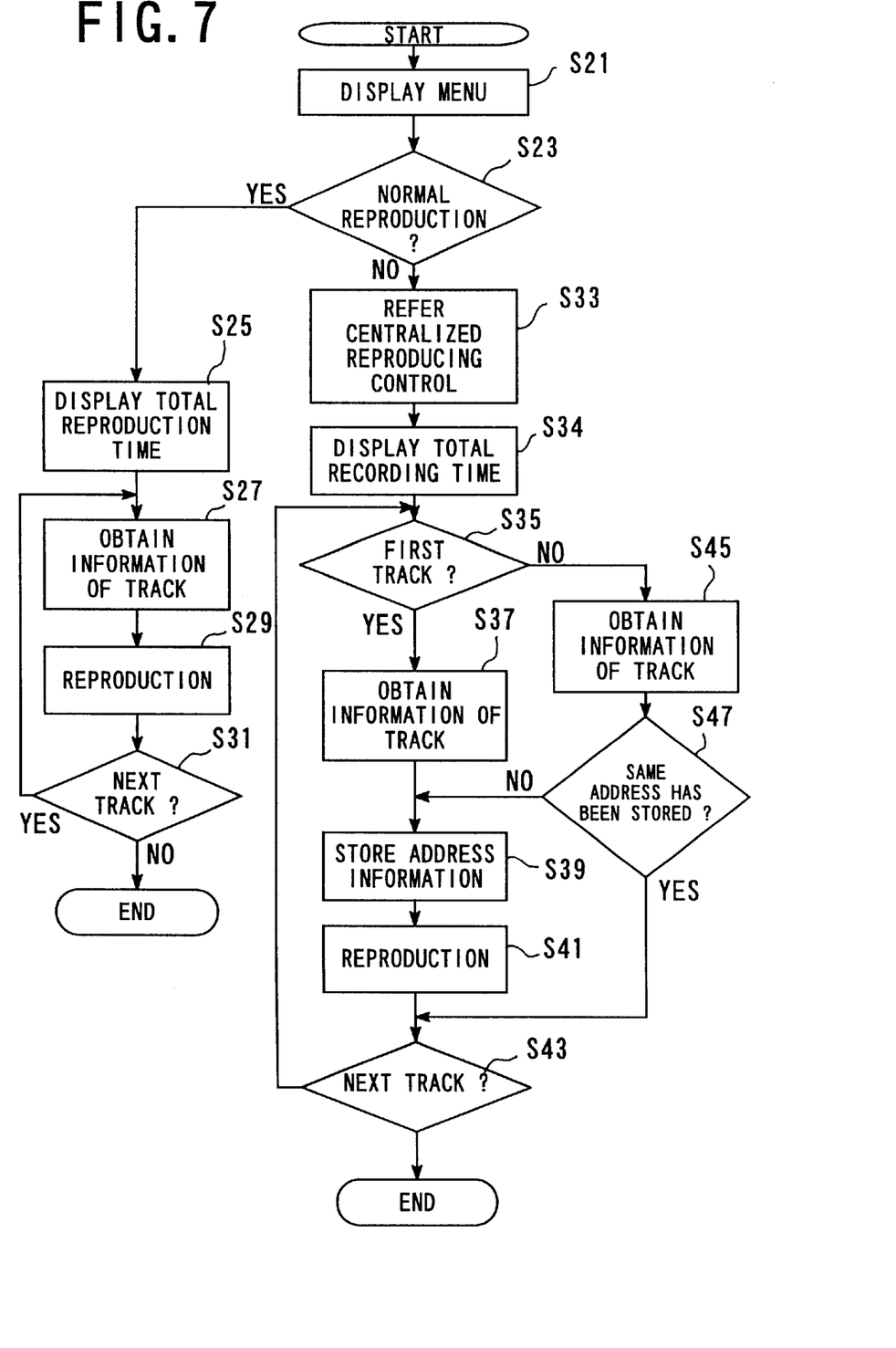
FIG. 7 is a flowchart showing a second process of the normal reproduction and a second process of the non-double reproduction in the embodiment of the present invention.

In FIG. 7, the reproducing apparatus displays the menu etc (step 21), the user selects either of the normal reproduction and the non-double reproduction (step 23). The use selects the normal reproduction, the normal reproduction is carried out in the same manner as the aforementioned first process.

On the other hand, the user selects the non-double reproduction (step 23, NO), the system controller 100 refers to the centralized audio information stored in the internal memory 100a (step 33), and displays the total recording time (step 34).

Next, the system controller 100 determines whether or not the track to be now reproduced is the first track of this audio DVD (step 35). For example, the first track is the track #1 of the title group #1 in the example shown in FIG. 3. If the track is first track, the system controller 100 obtains the track address information etc. with respect to this track from the centralized audio information (step 37), and stores this track address information into the internal memory 100a (step 39). More concretely, the system controller 100, at step 39, stores the start address information or both of the start address and end address.

Next, the system controller 100 reproduces this track (step 41), and determines on the basis of centralized audio information whether or not the next track exists (step 43). If the next track exists, the system controller 100 carries out the determination at step 35. As the next track is not the first track, the process proceeds to step 45, and the system controller 100, at step 45, obtains the track address information etc. with respect to this track. Next, the system controller 100 compares the obtained track address information of this track with the track address information which has been stored in the internal memory 100a. If the same track address information has been stored in the internal memory 100a (step 47, YES), the system controller 100 determines that this track is the doubled track. If so, the system controller 100 does not reproduce this track, and the process proceeds to step 43. On the other hand, the same track address information does not exist (step 47, NO), the system controller 100 determines that this track is not the bobbled track, and the track address information of this track is stored in the internal memory 100a (step 39). Then, the system controller 100 reproduces this track (step 41). Thereafter, the process proceeds to step 43, and system controller 100 is carried out the aforementioned processes on the next track.

In this manner, if the double flag is not included in the centralized audio information in the lead in area LI or the AMG 202, the doubled track can be determined by using the track address information or each track included in the centralized audio information, and the non-double reproduction can be carried out rapidly.

Thus, since the track address information of each track is included in the centralized audio information and this centralized audio information is recorded in the lead in area LI or the AMG 200, the non-double reproduction can be rapidly and easily carried out, if the double flag is not used.

As described above, according to the reproducing apparatus of the embodiment of the present invention, the normal reproduction and the non-double information can be carried out on the basis of the user's selection. Therefore, the audio information can be reproduced by appropriate process in accordance with the request from the user.

Furthermore, the amount of time necessary for the normal reproduction or the amount of time necessary for the non-doubled reproduction is displayed depending on the user's selection. Therefore, the user can know the reproduction time before the reproduction is actually carried out. When the audio information is copied from the audio DVD into another recording medium, such as a cassette tape, the user can confirm the total recording time, and select a cassette tape having the suitable recording time (recordable area) easily.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 09-328009 filed on Nov. 28, 1997 including the specification, claims, drawings and summary is incorporated herein by reference in its entirety.

What is claimed is:

1. An information recording medium comprising:
   a plurality of audio information which are independent of each other; and
   a plurality of reproducing control information to be used for reproducing said plurality of audio information, each of said plurality of reproducing control information being assigned to any one of said plurality of audio information,
   wherein said plurality of reproducing control information includes double reproducing control information, and said double reproducing control information is assigned to one of said plurality of audio information to which different one of said plurality of reproducing control information has been assigned.

2. An information recording medium according to claim 1, wherein said information recording medium includes a first information group comprising a set of said reproducing control information except said double reproducing control information, and a second information group comprising a set of said reproducing control information including said double reproducing control information.

3. An information recording medium according to claim 1, wherein said information recording medium further comprises centralized reproducing control information which includes all of said plurality of reproducing control information.

4. An information recording medium according to claim 1, wherein each of said plurality of reproducing control information includes address information which indicates a recording position of one of said plurality of audio information, and said double reproducing control information and said reproducing control information except said double reproducing control information include the same address information as each other.

5. An information recording medium comprising:
a plurality of audio information which are independent of each other;
a plurality of reproducing control information to be used for reproducing said plurality of audio information, each of said plurality of reproducing control information being assigned to any one of said plurality of audio information, wherein said plurality of reproducing control information includes double reproducing control information, and said double reproducing control information is assigned to one of said plurality of audio information to which different one of said plurality of reproducing control information has been assigned; and
centralized reproducing control information which includes all of said plurality of reproducing control information, wherein said centralized reproducing control information includes double assignment information which indicates whether or not said reproducing control information is said double reproducing control information.

6. An information recording medium comprising:
a plurality of audio information which are independent of each other;
a plurality of reproducing control information to be used for reproducing said plurality of audio information, each of said plurality of reproducing control information being assigned to any one of said plurality of audio information, wherein said plurality of reproducing control information includes double reproducing control information, and said double reproducing control information is assigned to one of said plurality of audio information to which different one of said plurality of reproducing control information has been assigned; and
centralized reproducing control information which includes all of said plurality of reproducing control information, wherein said centralized reproducing control information includes attribute information, and said attribute information includes at least information which indicates a recording position of one of said plurality of audio information, a sampling frequency and the number of bit of quantization with respect to each of said plurality of audio information.

7. An information recording medium comprising:
a plurality of audio information which are independent of each other;
a plurality of reproducing control information to be used for reproducing said plurality of audio information, each of said plurality of reproducing control information being assigned to any one of said plurality of audio information, wherein said plurality of reproducing control information includes double reproducing control information, and said double reproducing control information is assigned to one of said plurality of audio information to which different one of said plurality of reproducing control information has been assigned; and centralized reproducing control information which includes all of said plurality of reproducing control information, wherein said centralized reproducing control information is recorded in a lead in area of said information recording medium.

8. A reproducing apparatus for reproducing an information recording medium, said information recording medium comprising:
a plurality of audio information which are independent of each other;
a plurality of reproducing control information to be used for reproducing said plurality of audio information, each of said plurality of reproducing control information being assigned to any one of said plurality of audio information; and
centralized reproducing control information which includes all of said plurality of reproducing control information,
wherein said plurality of reproducing control information includes double reproducing control information, which is assigned to one of said plurality of audio information to which different one of said plurality of reproducing control information has been assigned, and said centralized reproducing control information includes double assignment information which indicates whether or not said reproducing control information is said double reproducing control information,
said reproducing apparatus comprising:
a reading device for reading information including said plurality of audio information, said plurality of reproducing control information and said centralized reproducing control information from said information recording medium;
an input device for inputting an instruction to select either of a normal reproduction and a non-double reproduction; and
a reproducing device for referring said centralized reproducing control information read by said read device, and reproducing said plurality of audio information,
wherein said reproducing device, if said normal reproduction is selected, reproduces said plurality of audio information according to all of said plurality of reproducing control information, and said reproducing device, if said non-double reproduction is selected, refers said double assignment information and reproduces said plurality of audio information according to said plurality of reproducing control information except said double reproducing control information.

9. A reproducing apparatus according to claim 8, wherein said centralized reproducing control information includes a first total reproduction time in a case of said normal reproduction and a second total reproduction time in a case of said non-double reproduction, and said reproducing apparatus further comprises a displaying device for displaying either of said first total reproduction time and said second total reproduction time.

10. A reproducing apparatus for reproducing an information recording medium, said information recording medium comprising:
a plurality of audio information which are independent of each other;
a plurality of reproducing control information to be used for reproducing said plurality of audio information, each of said plurality of reproducing control information being assigned to any one of said plurality of audio information; and centralized reproducing control information which includes all of said plurality of reproducing control information, wherein said plurality of reproducing control information includes double reproducing control information, which is assigned to one of said plurality of audio information to which different one of said plurality of reproducing control information has been assigned, and said centralized reproducing control information includes address information which indicates a recording position of one of said plurality of audio information, said reproducing apparatus comprising:
- a reading device for reading information including said plurality of audio information, said plurality of reproducing control information and said centralized reproducing control information from said information recording medium;
- an input device for inputting an instruction to select either of a normal reproduction and a non-double reproduction;
- a reproducing device for referring said centralized reproducing control information read by said read device, and reproducing said plurality of audio information; and
- a storage device for storing said address information of said audio information that has been previously reproduced by said reproducing device, wherein said reproducing device, if said normal reproduction is selected, reproduces said plurality of audio information according to all of said plurality of reproducing control information, and said reproducing device, if said non-double reproduction is selected, refers said address information in said storage device and reproduces said plurality of audio information according to said reproducing control information assigned to said audio information whose address information has not been stored in said storage device.

11. A reproducing apparatus according to claim 10, wherein said centralized reproducing control information includes a first total reproduction time in a case of said normal reproduction and a second total reproduction time in a case of said non-double reproduction, and said reproducing apparatus further comprises a displaying device for displaying either of said first total reproduction time and said second total reproduction time.

12. An information recording medium comprising:
- a plurality of audio information each corresponding to any one of a plurality of song to be reproduced independently;
- a plurality of reproducing control information to be used for reproducing said plurality of audio information, each of said plurality of reproducing control information being assigned to any one of said plurality of audio information; and
- a title group information for defining a plurality of title groups each of which is a set of said plurality of songs, wherein a same song is doubly included in more than one of said plurality of title groups.

13. A reproducing apparatus for reproducing an information recording medium, said information recording medium comprising:
- a plurality of audio information each corresponding to any one of a plurality of song to be reproduced independently;
- a plurality of reproducing control information to be used for reproducing said plurality of audio information, each of said plurality of reproducing control information being assigned to any one of said plurality of audio information; and
- a title group information for defining a plurality of title groups each of which is a set of said plurality of songs, wherein a same song is doubly included in more than one of said plurality of title groups, said reproducing apparatus comprising:
- a reading device for reading information including said plurality of audio information, said plurality of reproducing control information and title group information; and
- a reproducing device for referring to said title group information, and reproducing all of said plurality of songs included in each of said plurality of title group according to said reproducing control information.

14. A reproducing apparatus for reproducing an information recording medium, said information recording medium comprising:
- a plurality of audio information each corresponding to any one of a plurality of song to be reproduced independently;
- a plurality of reproducing control information to be used for reproducing said plurality of audio information, each of said plurality of reproducing control information being assigned to any one of said plurality of audio information; and
- a title group information for defining a plurality of title groups each of which is a set of said plurality of songs, wherein one of a same song is doubly included in more than one of said plurality of title groups, said reproducing apparatus comprising:
- a reading device for reading information including said plurality of audio information, said plurality of reproducing control information and title group information;
- an identifying device for referring to said title group information, and for identifying said song that is doubly included in more than one of said plurality of title groups; and
- a reproducing device for reproducing said audio information corresponding to each of said plurality of songs according to said reproducing control information, wherein said reproducing device reproduces said audio information except audio information that has been previously reproduced.

* * * * *